(12) United States Patent
Kim et al.

(10) Patent No.: US 10,871,038 B2
(45) Date of Patent: Dec. 22, 2020

(54) DRILL BIT FOR DRILLING AND METHOD FOR MANUFACTURING SAME

(71) Applicant: EHWA DIAMOND INDUSTRIAL CO., LTD., Osan-si (KR)

(72) Inventors: Ki-Ho Kim, Seongnam-si (KR); Jun-Yong Yun, Suwon-si (KR)

(73) Assignee: EHWA DIAMOND INDUSTRIAL CO., LTD., Osan-si (KR)

( * ) Notice: Subject to any disclaimer, the term of this patent is extended or adjusted under 35 U.S.C. 154(b) by 0 days.

(21) Appl. No.: 16/797,240

(22) Filed: Feb. 21, 2020

(65) Prior Publication Data

US 2020/0190911 A1 Jun. 18, 2020

Related U.S. Application Data

(62) Division of application No. 15/521,009, filed as application No. PCT/KR2015/009086 on Aug. 28, 2015, now Pat. No. 10,605,007.

(30) Foreign Application Priority Data

Oct. 23, 2014 (KR) .................. 10-2014-0143954
May 21, 2015 (KR) .................. 10-2015-0065815

(51) Int. Cl.
| | |
|---|---|
| *E21B 10/46* | (2006.01) |
| *E21B 10/55* | (2006.01) |
| *B23P 5/00* | (2006.01) |
| *C21D 9/22* | (2006.01) |
| *C22C 38/00* | (2006.01) |
| *C22C 38/02* | (2006.01) |
| *C22C 38/22* | (2006.01) |

(Continued)

(52) U.S. Cl.
CPC ............... *E21B 10/55* (2013.01); *B23P 5/00* (2013.01); *C21D 9/22* (2013.01); *C22C 38/002* (2013.01); *C22C 38/02* (2013.01); *C22C 38/22* (2013.01); *C22C 38/32* (2013.01); *C22C 38/38* (2013.01); *E21B 10/02* (2013.01); *E21B 10/46* (2013.01); *C21D 1/42* (2013.01); *C21D 2211/002* (2013.01); *C21D 2211/005* (2013.01); *C21D 2211/008* (2013.01); *C21D 2211/009* (2013.01)

(58) Field of Classification Search
CPC ............ B22F 2005/001; B22F 2998/00; E21B 10/46; E21B 10/48
See application file for complete search history.

(56) References Cited

U.S. PATENT DOCUMENTS

| | | |
|---|---|---|
| 2,297,983 A | 10/1942 | Rea |
| 2,662,738 A | 12/1953 | Davis et al. |
| 2015/0344997 A1 | 12/2015 | Linden et al. |

FOREIGN PATENT DOCUMENTS

| | | |
|---|---|---|
| JP | S63-237877 A | 10/1988 |
| JP | H09-13863 A | 1/1997 |

(Continued)

OTHER PUBLICATIONS

International Search Report for PCT/KR2015/009086 dated Nov. 25, 2015.

*Primary Examiner* — Kipp C Wallace
(74) *Attorney, Agent, or Firm* — Hauptman Ham, LLP

(57) ABSTRACT

Disclosed are a drill bit for drilling and a method for manufacturing same, in which the hardness of a body part of a shank can be selectively improved by performing rapid cooling in a forced cooling method after performing rapid heating selectively only on the body part of the shank in a high-frequency induction heating method after completing infiltration.

8 Claims, 7 Drawing Sheets

(51) Int. Cl.
- *C22C 38/32* (2006.01)
- *C22C 38/38* (2006.01)
- *E21B 10/02* (2006.01)
- *C21D 1/42* (2006.01)

(56) References Cited

FOREIGN PATENT DOCUMENTS

| | | |
|---|---|---|
| JP | 2004-2968 A | 1/2004 |
| JP | 2011-62712 A | 3/2011 |
| JP | 2011-256421 A | 12/2011 |
| KR | 10-0939462 B1 | 1/2010 |
| KR | 10-2011-0104516 A | 9/2011 |
| KR | 10-2014-0022287 A | 2/2014 |

DRILL BIT FOR DRILLING AND METHOD FOR MANUFACTURING SAME

CROSS REFERENCE TO RELATED APPLICATION

This present application is a Divisional Application to U.S. patent application Ser. No. 15/521,009, filed on Apr. 21, 2017, which is a national stage filing under 35 U.S.C § 371 of PCT application number PCT/KR2015/009086 filed on Aug. 28, 2015 which is based upon and claims the benefit of priority to Korean Patent Application Nos. 10-2014-0143954 filed on Oct. 23, 2014 and 10-2015-0065815 filed on May 12, 2015 in the Korean Intellectual Property Office. The disclosures of the above-listed applications are hereby incorporated by reference herein in their entirety.

TECHNICAL FIELD

The present disclosure relates to a drill bit for drilling and a method of manufacturing the same, and more particularly, to a drill bit for drilling and a method of manufacturing the same, for selectively enhancing the hardness of a body part of a shank by selectively performing rapid heating only on the body part of the shank via high-frequency induction heating and, then, performing rapid cooling via forcible cooling after an infiltration process is completely performed.

BACKGROUND ART

A drill bit for directly drilling into the bedrock and collecting bedrock core sample (core) has been used with a matrix that is appropriately designed in order to estimate distribution and deposits of mineral resources. In this case, the matrix of the drill bit is a part that directly contracts the bedrock and drills into the bedrock and includes diamond abrasives therein.

In general, a drill bit includes a matrix part that is manufactured using a typically called "infiltration process" of forming a mold by mixing diamond and metal powder such as tungsten (W), molybdenum (Mo), and cobalt (Co), heating a metallic binder in a state of an alloy or single metal such as copper (Cu), tin (Sn), nickel (Ni), and manganese (Mn) to a melting point or more, and filling the mold with the metallic binder according to capillary force. The matrix part is connected to a backing part for fixing a shank (steel body) and is integrally manufactured via one number of times of infiltration process to complete a drill bit. In general, with regard to manufacture of a drill bit, about 1,000 C or more as a melting point of a metallic binder is maintained while a shank is inserted into a matrix in a molding state and an upper end of a backing part and, thus, the shank inevitably experiences high temperature in order to manufacture a core bit and, in this case, the hardness of the shank is degraded.

As such, a shank performs a function of fixedly supporting a matrix in a drill bit used to drill into various types of bedrocks and, accordingly, should not be abraded until the matrix is completely consumed. However, in an actual working area, a shank may be remarkably abraded and a diamond tip may not be completely consumed and, in a serious case, the shank and the matrix may be separated and detached during a drilling operation and left in a drilling hole, which does immense damage to the drilling operation.

In order to prevent a shank from being abraded, particles with high hardness are attached on a surface of the shank in the form of a band to alleviate an abrasion degree of the shank, but the alleviated degree is not high. In addition, the shank is formed of alloy steel with high hardness to alleviate an abrasion degree, but there is a limit in a width for enhancing hardness according to change in steel type is restrictive and, accordingly, it is difficult to overcome the problem.

Korean Patent Publication No. 10-2014-0022287 (published on Feb. 24, 2014) as the cited reference discloses a core bit for core drilling.

DISCLOSURE

Technical Problem

It is an object of the present disclosure to provide a drill bit for drilling and a method of manufacturing the same, for selectively enhancing the hardness of a body part of a shank by selectively performing rapid heating only on the body part of the shank via high-frequency induction heating and, then, performing rapid cooling via forcible cooling after an infiltration process is completely performed.

Technical Solution

In accordance with one aspect of the present disclosure, a drill bit for drilling includes including a shank and a diamond tip coupled to an upper end of the shank, wherein the shank includes a body part connected to a lower end of the diamond tip and having a first thickness, and a screw coupling part integrally connected to a lower end of the body part and having a second thickness smaller than the first thickness, hardness of a surface of the body part of the shank has a higher value than hardness of a surface of the screw coupling part of the shank, and the body part of the shank has 300 Hv or more as hardness to 2 mm from the surface.

In accordance with another aspect of the present disclosure, a method of manufacturing a drill bit for drilling includes (a) integrally coupling a shank and a diamond tip, (b) spraying cooling medium on a surface of the diamond tip immediately after rapidly heating a surface of a body part of the shank up to point Ac3 to point Ac3+200 C via high-frequency induction heating, and (c) rapidly cooling the surface of the body part of the heated shank at speed of 20 C/sec or more via forcible cooling.

Advantageous Effects

When a drill bit for drilling and a method of manufacturing the same according to the present disclosure are used, an infiltration process is performed and, then, rapid heating and cooling are selectively performed only on a body part of a shank using a high-frequency induction heating method and, simultaneously, cooling water is continuously sprayed to a diamond tip connected to the shank and, accordingly, the diamond tip may be prevented from being affected by heat while the hardness of the body part of the shank is enhanced. Accordingly, it may be appropriate to apply the drill bit to a mining tool such as a reaming shell, a casing shoe, and a casing bit.

The drill bit for drilling manufactured via the method according to the present disclosure may be configured in such a way that a body part of a shank has a structure including one or more of bainite and martensite, which have a rapid-cooled and heat-treated structure as a fine structure to 2 mm from a surface of the body part and has a structure including one or more of ferrite and pearlite, which as a non-heat structure as a fine structure of a thickness core and, accordingly, the hardness of the surface of the body part of the shank has a higher value than the hardness of a surface of the screw coupling part of the shank and the body part of the shank may also have 300 Hv or more as hardness to 2 mm from a surface thereof. As a result, when the drill bit for drilling according to the present disclosure is used, even if the surface of the body part of the shank is abraded in a poor environment during drilling into the bedrock, the body part of the shank has 300 Hv or more as hardness to 2 mm from a surface thereof and, accordingly, a period for replacement due to shank abrasion may be increased, increasing a lifetime of the drill bit.

BEST MODE

Figure 1:
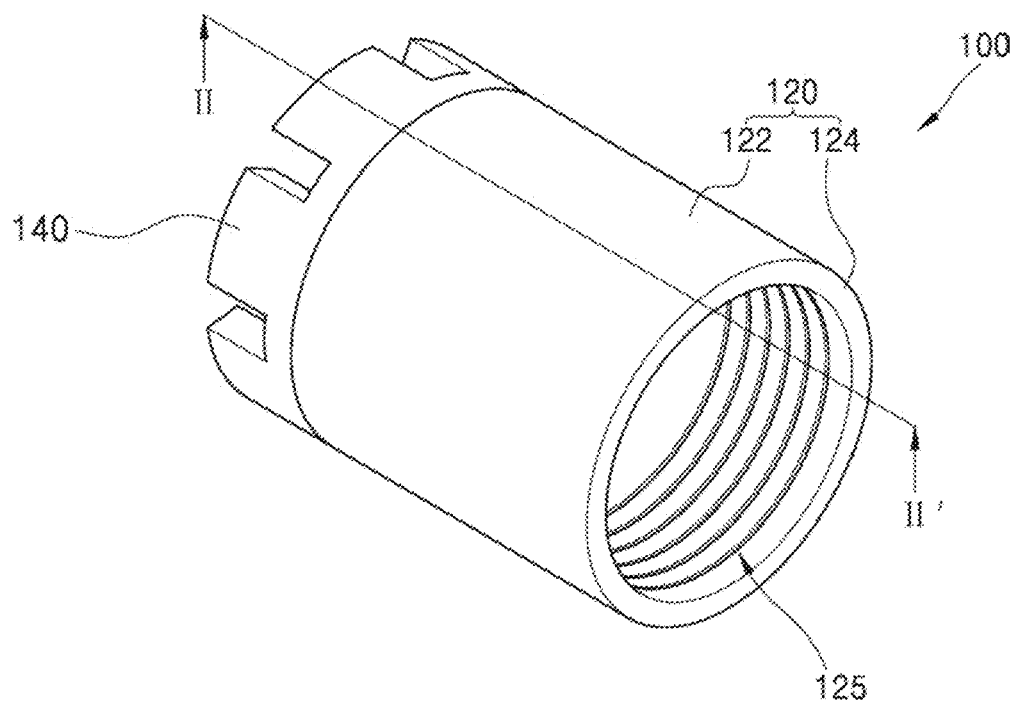
FIG. 1 is a perspective view of a drill bit for drilling according to an exemplary embodiment of the present disclosure.

The attached drawings for illustrating exemplary embodiments of the present disclosure are referred to in order to gain a sufficient understanding of the present disclosure, the merits thereof, and the objectives accomplished by the implementation of the present disclosure. The present disclosure may, however, be embodied in many different forms and should not be construed as being limited to the embodiments set forth herein; rather, these embodiments are provided so that this disclosure will be thorough and complete, and will fully convey the concept of the present disclosure to one of ordinary skill in the art. Meanwhile, the terminology used herein is for the purpose of describing particular embodiments and is not intended to limit the present disclosure. Like reference numerals in the drawings denote like elements.

Hereinafter, a drill bit for drilling and a method of manufacturing the same according to exemplary embodiments of the present disclosure will be described in detail with reference to the attached drawings.

Figure 2:
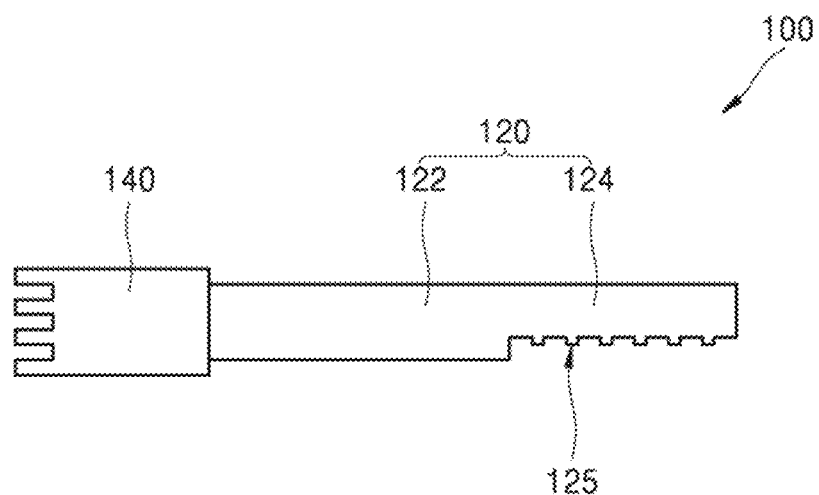
FIG. 2 is a cross-sectional view taken along a line II-II' of FIG. 1

FIG. 1 is a perspective view of a drill bit 100 for drilling according to an exemplary embodiment of the present disclosure. FIG. 2 is a cross-sectional view taken along a line II-II' of FIG. 1.

Referring to FIGS. 1 and 2, the drill bit 100 for drilling according to an exemplary embodiment of the present disclosure may include a shank 120 and a diamond tip 140 coupled to an upper end of the shank 120.

The shank 120 may be mainly formed of a steel plate as a steel material, in more detail, carbon steel, alloy steel, or the like and, in this regard, the hardness of the steel plate is affected by components thereof, but in the case of a steel plate with the content of carbon of about 0.1 wt % or more, hardness is largely affected by speed at which the steel plate is maintained at high temperature and then cooled to room temperature.

For example, the shank 120 may be formed of a steel plate composed of C of 0.10 to 0.70%, Si of 0.5% or less, Mn of 0.1 to 2.0%, S of 0.02% or less, P of 0.03% or less, Mo of 0.05 to 0.50%, Cr of 0.1 to 0.5%, B of 0.001 to 0.010%, and Fe and other inevitable impurities of the remaining portion, of which units are wt %, but is not limited thereto and, thus, may apply various steel types.

In order to manufacture drill bit 100 for drilling, which is formed in such a way that a general matrix and the shank 120 are integrally manufactured, an infiltration process may be performed at high speed and, then, a cooling process is performed and, in this case, cooling may be performed via furnace cooling or air cooling.

That is, cooling may be performed via furnace cooling at speed of 1 C/sec or less or performed via air cooling at speed of 5 C/sec or less and, in this case, the hardness of a steel plate may be degraded after the infiltration process, which commonly occurs in both carbon steel and alloy steel.

The drill bit 100 for drilling according to the present disclosure drills into about several hundreds of meters or more and, thus, is installed and used in high-power equipment. Accordingly, although it is very important to ensure the abrasion resistance of the shank 120, the drill hit 100 or drilling needs to be integrally manufactured according to the product characteristics and, in this case, the shank 120 experiences high temperature and, then, the hardness of the shank 120 is inevitably degraded due to low cooling speed.

Accordingly, according to the present disclosure, high-frequency heat treatment may be selectively performed only on the shank 120, in particular, a body part 122 of the shank 120 after an infiltration process is performed and, then, rapid cooling may be performed, thereby selectively enhancing the hardness of the body part 122 of the shank 120. Although the case in which high-frequency heat treatment is performed and, then, rapid cooling is performed has been described with regard to the present disclosure, this is merely exemplary and, thus, laser heat treatment instead of high-frequency heat treatment may also be applied. In this case, in the case of laser heat treatment, heat treatment may be locally performed using a YAG laser, a $CO_2$ laser, or the like while the shank 120 is rotated. However, when laser heat treatment is used, there is a limit in that only surface hardness within about 1 mm or less from a surface of the body part 122 of the shank 120 is increased and, thus, high-frequency heat treatment may be appropriate than laser heat treatment.

In particular, the shank 120 may include the body part 122 that is connected to a lower end of the diamond tip 140 and has a first thickness, and a screw coupling part 124 that is integrally connected to a lower end of the body part 122 and has a second thickness smaller than the first thickness.

In this case, according to the present disclosure, rapid cooling after high-frequency heat treatment may be selectively performed only on the body part 122 of the shank 120 and, accordingly, the hardness of a surface of the body part 122 of the shank 120 may have a higher value than the hardness of a surface of the screw coupling part 124 of the shank 120.

In particular, the body part 122 of the shank 120 may have 300 Hv or more as hardness to 2 mm from a surface thereof. For example, the body part 122 of the shank 120 may have 300 to 700 Hv as hardness to 4 mm from a surface of the body part.

The body part 122 of the shank 120 may have a structure including one or more of ferrite and pearlite, which have a rapid-cooled and heat-treated structure as a fine structure to 2 mm from a surface of the body part and have a non heat-treated fine structure as a fine structure of a thickness core. In more detail, the body part 122 of the shank 120 may have a structure including one or more of bainite and martensite, which have a rapid-cooled and heat-treated structure as a fine structure to 2 mm from the surface of the body part and, in this case, the rapid-cooled and heat-treated structure may have a cross section ratio of 50% or more.

The screw coupling part 124 of the shank 120 may have a structure including one or more of ferrite and pearlite, which have a non-heated fine structure as fine structures of a surface and a thickness core.

The shank 120 may have a hollow cylindrical structure, may include a screw thread 125 formed inside the screw coupling part 124, and may be screwed to a plurality of cylindrical pipes (not shown) in order to drill into several hundreds of meters or more.

The aforementioned drill bit for drilling according to an exemplary embodiment of the present disclosure may be configured in such a way that a body part of a shank has a structure including one or more of bainite and martensite, which have a rapid-cooled and heat-treated structure as a fine structure to 2 mm from a surface of the body part and has a structure including one or more of ferrite and pearlite, which as a non-heat structure as a fine structure of a thickness core and, accordingly, the hardness of the surface of the body part of the shank has a higher value than the hardness of a surface of the screw coupling part of the shank and the body part of the shank may also have 300 Hv or more as hardness to 2 mm from a surface thereof.

As a result, when a drill bit for drilling according to an exemplary embodiment of the present disclosure is used, even if a surface of a body part of a shank is abraded in a poor environment during drilling into the bedrock, the body part of the shank has 300 Hv or more as hardness to 2 mm from a surface thereof and, accordingly, a period for replacement due to shank abrasion may be increased, increasing a lifetime of the drill bit.

Hereinafter, a method of manufacturing a drill bit for drilling according to an exemplary embodiment of the present disclosure will be described with reference to the attached drawings.

Figure 3:
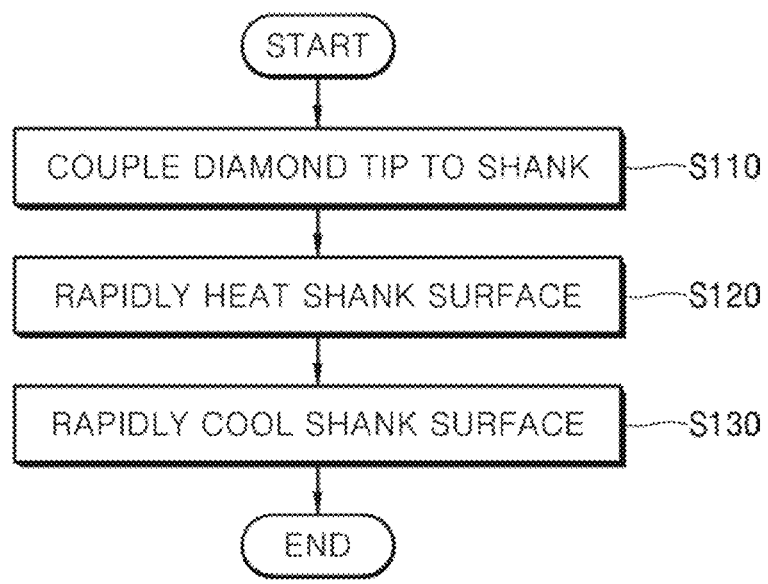
FIG. 3 is a process flowchart illustrating a method of manufacturing a drill bit for drilling according to an exemplary embodiment of the present disclosure.
Figure 4:
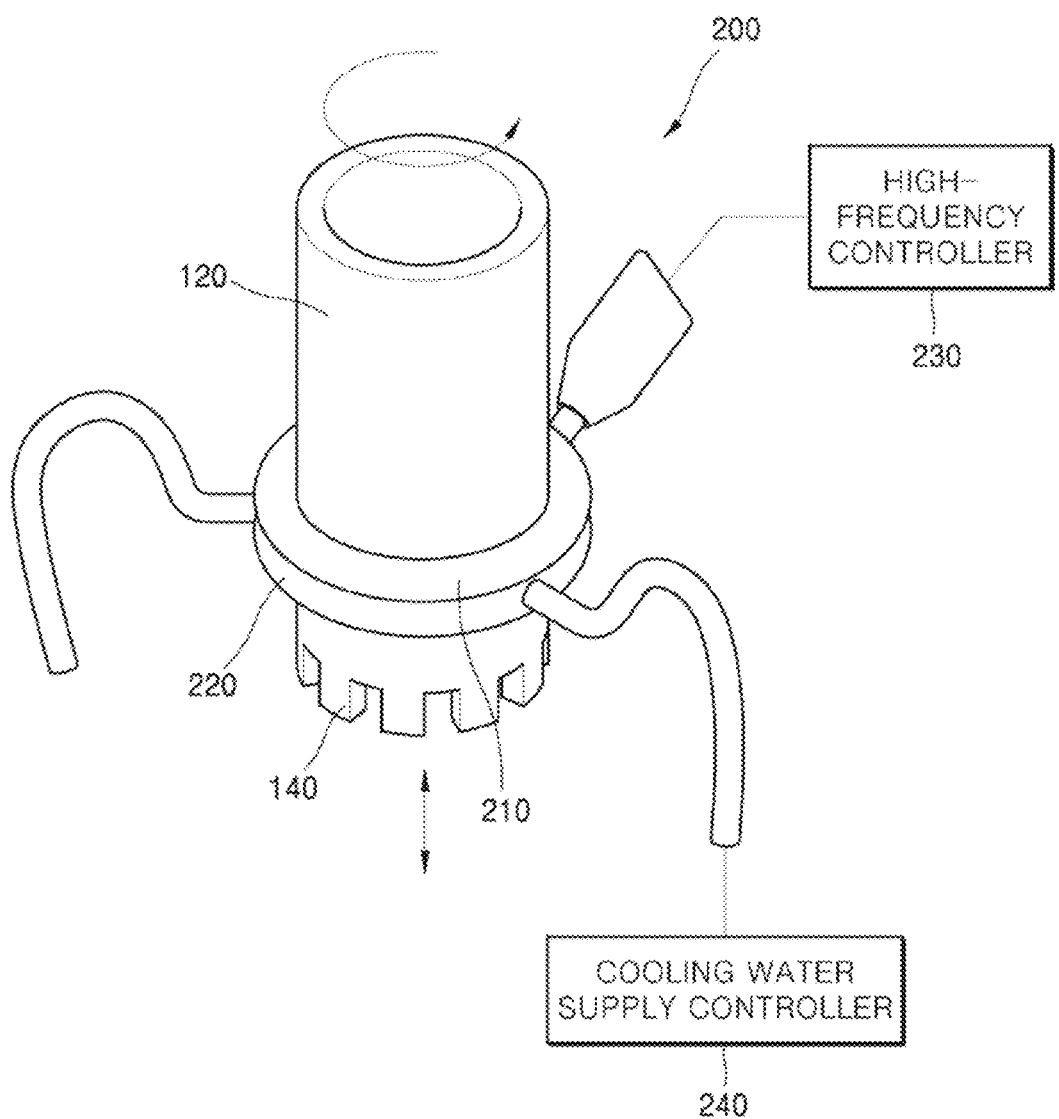
FIG. 4 is a perspective view illustrating a high-frequency induction heating and cooling composite unit and will be described in conjunction with FIG. 1.

FIG. 3 is a process flowchart illustrating a method of manufacturing a drill bit for drilling according to an exemplary embodiment of the present disclosure. FIG. 4 is a perspective view illustrating a high-frequency induction heating and cooling composite unit and will be described in conjunction with FIG. 1.

Referring to FIGS. 1, 3, and 4, the method of manufacturing a drill bit for drilling according to an exemplary embodiment of the present disclosure may include coupling a diamond tip to a shank (S110), rapidly heating a surface of the shank (S120), and rapidly cooling the surface of the shank (S130).

Coupling of Diamond Tip to Shank

In the coupling of the diamond tip to the shank (S110), the shank 120 and the diamond tip 140 may be integrally coupled.

The coupling of the diamond tip to the shank (S110) may be subdivided into inserting the shank 120 into a matrix (not shown) including a diamond mold and a backing part connected to the diamond mold, infiltrating the diamond mold at a temperature of 850 to 13000 to couple the diamond tip 140 to an upper end of the shank 120, cooling the shank 120 with the diamond tip 140 thereto via furnace cooling, and performing lathe machining on the cooled shank 120.

Although not illustrated in detail in the drawing, during an infiltration process, a diamond mold is formed by mixing diamond and metal powder such as tungsten (W), molybdenum (Mo), and cobalt (Co) in a carbon mold, a metallic binder in a state of an alloy or single metal such as copper (Cu), tin (Sn), nickel (Ni), and manganese (Mn) is heated to a melting point or more, and the diamond mold is filled with the metallic binder according to capillary force to couple the diamond tip 140 to the upper end of the shank 120.

In this case, may be mainly formed of a steel plate as a steel material, in more detail, carbon steel, alloy steel, or the like and, in this regard, the hardness of the steel plate is affected by components thereof, but in the case of a steel plate with the content of carbon of about 0.1 wt % or more, hardness is largely affected by speed at which the steel plate is maintained at high temperature and then cooled to room temperature.

For example, the shank 120 may be formed of a steel plate composed of C of 0.10 to 0.70%, Si of 0.5% or less, Mn of 0.1 to 2.0%, S of 0.02% or less, P of 0.03% or less, Mo of 0.05 to 0.50%, Cr of 0.1 to 0.5%, B of 0.001 to 0.010%, and Fe and other inevitable impurities of the remaining portion, of which units are wt %, but is not limited thereto and, thus, may apply various steel types.

In order to manufacture the drill bit 100 for drilling, which is formed in such a way that a general matrix and the shank 120 are integrally manufactured, an infiltration process may be performed at high speed and, then, a cooling process is performed and, in this case, cooling may be performed via furnace cooling or air cooling.

That is, cooling may be performed via furnace cooling at speed of 1 C/sec or less or performed via air cooling at speed of 5 C/sec or less and, in this case, the hardness of a steel plate may be degraded after the infiltration process, which commonly occurs in both carbon steel and alloy steel.

The drill bit 100 for drilling according to the present disclosure drills into about several hundreds of meters or more and, thus, is installed and used in high-power equipment. Accordingly, although it is very important to ensure the abrasion resistance of the shank 120, the drill bit 100 for drilling needs to be integrally manufactured according to the product characteristics and, in this case, the shank 120 experiences high temperature and, then, the hardness of the shank 120 is inevitably degraded due to low cooling speed.

Accordingly, the present disclosure proposes a method for enhancing the hardness of the body part 122 of the shank 120 by selectively performing high-frequency heat treatment only on a body part 122 of the shank 120 after an infiltration process is performed and, then, performing rapid cooling, which will be described below in detail.

Rapidly Heating of Surface of Shank

In the rapidly heating of the surface of the shank (S120), as the shank 120 and the diamond tip 140 are rotated, cooling medium is sprayed on a surface of the diamond tip 140 immediately after the surface of the body part 122 of the shank 120 is rapidly heated up to point Ac3 to point Ac3+200 C via high-frequency induction heating. In this case, the cooling medium may be cooling water, fluid, liquefied gas, or the like and, in this regard, cooling medium may be directly sprayed on the surface of the diamond tip 140 or the surface of the diamond tip 140 may be indirectly cooled by cooling medium that circulates in a cooling medium supply line 220.

In particular, according to the present disclosure, high-frequency induction heating and cooling may be simultaneously implemented using a high-frequency induction heating and cooling composite unit 200 including an induction coil 210 coiled to surround an outer circumferential surface of the shank 120, and the cooling medium supply line 220 that is installed below the induction coil 210 to be spaced apart therefrom and coiled to surround the shank 120 and the diamond tip 140 and in which cooling medium circulates.

The high-frequency induction heating and cooling composite unit 200 may further include a high-frequency controller 230 for controlling a high-frequency signal applied to the induction coil 210 and a cooling water supply controller 240 for controlling supply of cooling medium introduced into the cooling medium supply line 220.

Although not illustrated in the drawings, the high-frequency induction heating and cooling composite unit 200 may further include an up and down unit (not shown) that is installed below the shank 120 and the diamond tip 140 and controls up and down movement of the shank 120 and the diamond tip 140. The up and down unit may selectively control a heat-treatment location of the shank 120.

In this case, point Ac3 of a high-frequency induction heating temperature may be 740 to 8800. When the high-frequency induction heating temperature is less than point Ac3, it may be difficult to ensure target hardness. On the other hand, when the high-frequency induction heating temperature exceeds point Ac3+2000, this is a factor for degrading internal toughness and, thus, damage error after coupling with other components may be encountered.

Accordingly, in the case of the drill bit 100 for drilling manufactured via the method according to the present disclosure, the body part 122 of the shank 120 connected to a lower end of the diamond tip 140 is most greatly abraded and, accordingly, it is most important to appropriately intensify the body part 122.

However, even if high-frequency induction heating is selectively performed on the body part 122 of the shank 120, heat may be conducted to the diamond tip 140 and the diamond tip 140 may be affected by heat, which degrades the performance of the drill hit 100. In order to prevent this, cooling medium may be continuously sprayed to the surface of the diamond tip 140 and, thus, the diamond tip 140 may not be affected by heat.

In this case, high-frequency induction heating may be selectively performed only on the body part 122 of the shank 120 connected to the diamond tip 140.

On the other hand, high-frequency induction heating may be performed up to a lower end of the body part 122 of the shank 120 from an upper end of the body part 122 of the shank 120 and, accordingly, heat treatment may not be performed on the screw coupling part 124 connected to the lower end of the body part 122 of the shank 120. As such, according to the present disclosure, the shank 120 may be intensified just before the screw coupling part 124 from just below the diamond tip 140 and, in this regard, the intensified shank 120 exhibits high hardness corresponding to a state in which it is not possible to perform lathe machining and, accordingly, processing may be performed in the form of a last product prior to high-frequency induction heating.

In this case, when heat treatment of high-frequency induction heating is performed up to the screw coupling part 124, impact toughness is reduced despite high hardness and hardness and, thus, the drill bit 100 may be torn and, accordingly, a heat-treatment region may be limited to a portion prior to the screw coupling part 124.

In particular, in order to obtain overall uniform hardness intensifying characteristics, high-frequency induction heat heat-treatment may be implemented as the shank 120 is rotated and, in detail, the shank 120 and the diamond tip 140 may be rotated at speed of 10 to 200 rpm.

Rapidly Cooling of Surface of Shank

In the rapidly cooling of the surface of the shank (S130), the surface of the body part 122 of the heat shank 120 may be forcibly cooled and rapidly cooled at speed of 20 C/sec or more, for example, speed of 50 to 200 C/sec. In this case, rapid cooling may be performed by performing control to selectively perform forcible cooling only on the body part 122 of the shank 120 on which rapid cooling is selectively heated.

Forcible cooling may be any one selected from methods of gas cooling, oil cooling, and gas cooling and may be any method as long as the method ensures cooling speed of 20 C/sec or more.

In this case, when cooling speed is less than 20 C/kg it may be difficult to ensure hardness. On the other hand, when cooling speed exceeds 200 C/sec, hardness and hardness are advantageously ensured but there is a problem in that impact toughness is degraded due to mass production of a low-temperature structure.

In the drill bit for drilling manufactured via the aforementioned operations S110 to S130, an infiltration process is performed and, then, rapid heating and cooling are selectively performed only on a body part of a shank using a high-frequency induction heating method and, simultaneously, cooling water is continuously sprayed to a diamond tip connected to the shank and, accordingly, the diamond tip may be prevented from being affected by heat while the hardness of the body part of the shank is enhanced. Accordingly, it may be appropriate to apply the drill bit to a mining tool such as a reaming shell, a casing shoe, and a casing bit.

EXAMPLE

Hereinafter, the configuration and operation of the present disclosure will be described in detail with reference to the following examples. However, these examples are not intended to limit the purpose and scope of the examples.

Information that is not stated herein is sufficiently understood by one of ordinary skill in the art and, thus, a detailed description thereof will be omitted.

1. Manufacturing of Drill Bit

Example 1

A shank formed of carbon steel was inserted into and coupled to a matrix including a diamond mold and a backing part connected to the diamond mold and, then, the diamond mold was infiltrated at 1100 C to couple a diamond tip to an upper end of the shank. Then, the shank with the diamond tip coupled thereto was cooled at speed of 0.5 C/sec via furnace cooling and, then, a lathe machining process was performed on the shank.

Then, as the shank and the diamond tip are rotated at speed of 100 rpm, only a surface of a body part of the shank was rapidly heated to 880 C via high-frequency induction heating. In this case, cooling water was continuously sprayed to the surface of the diamond tip. Then, the surface of the body part of the shank heated to 880 C was rapidly cooled at speed of 100 C/sec to manufacture the drill bit.

Comparative Example 1

A shank formed of carbon steel was inserted into and coupled to a matrix including a diamond mold and a backing part connected to the diamond mold and, then, the diamond mold was infiltrated at 1100 C to couple a diamond tip to an upper end of the shank. Then, the shank with the diamond tip coupled thereto was cooled at speed of 0.5 C/sec via furnace cooling and, then, a lathe machining process was performed on the shank to manufacture a drill bit.

Comparative Example 2

A drill bit was manufactured in the same method as Comparative Example 1 except that a shank is formed of alloy steel.

2. Estimation of Physical Properties

Figure 5:
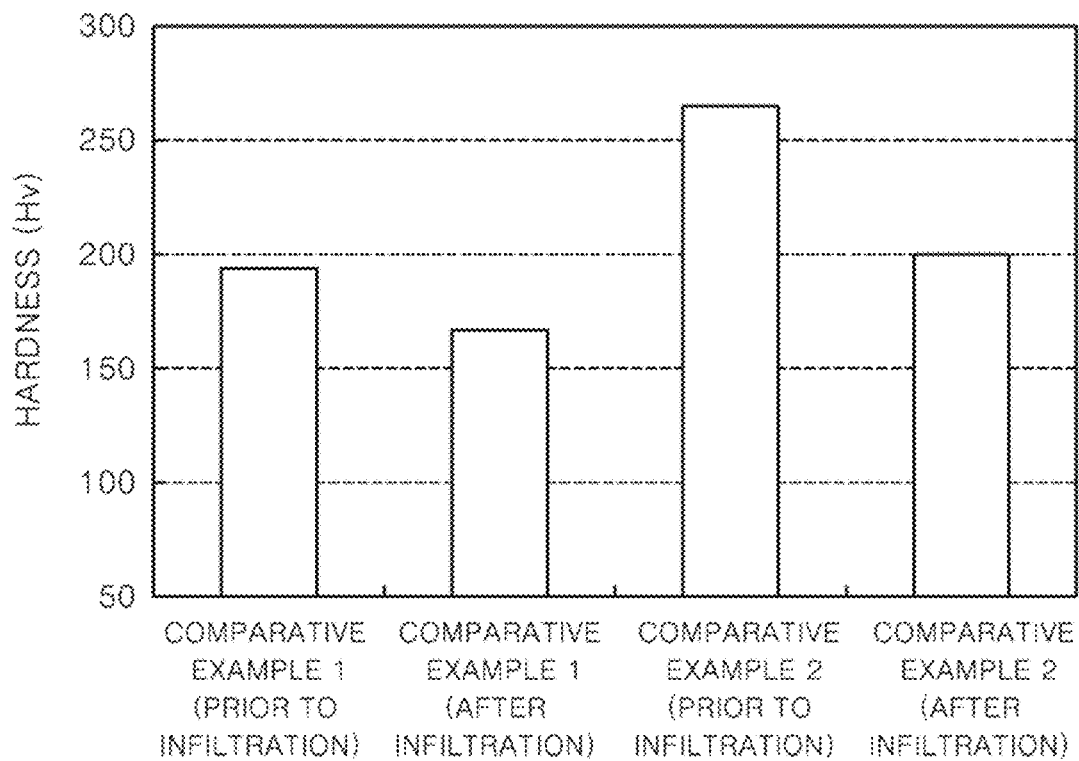
FIG. 5 is a graph showing a result of hardness measurement with respect to Comparative Examples 1 and 2 above.

FIG. 5 is a graph showing a result of hardness measurement with respect to Comparative Examples 1 and 2 above.

FIG. 5 shows change in hardness of the shanks according to Comparative Examples 1 and 2 above. In this case, the drawing shows hardness of the shanks according to Comparative Examples 1 and 2 before and after an infiltration process.

It is seen that the hardness after the infiltration process compared with the hardness in a material state is reduced, that is, hardness is reduced to 165 Hv from 215 Hv in the case of Comparative Example 1 (carbon steel). In addition, in the case of Comparative Example 2 (alloy steel), it is seen that high hardness of 345 Hv is shown in a material state but hardness is greatly reduced to 222 Hv after infiltration.

In the case of Comparative Examples 1 and 2, a hardness range after the infiltration process is a level in which a shank is prevented from being abraded during an actual drilling process, a diamond tip is left but the shank is seriously abraded and, accordingly, the drilling process is not possible any longer or, seriously, the diamond tip and the shank are inevitably separated.

Figure 6:
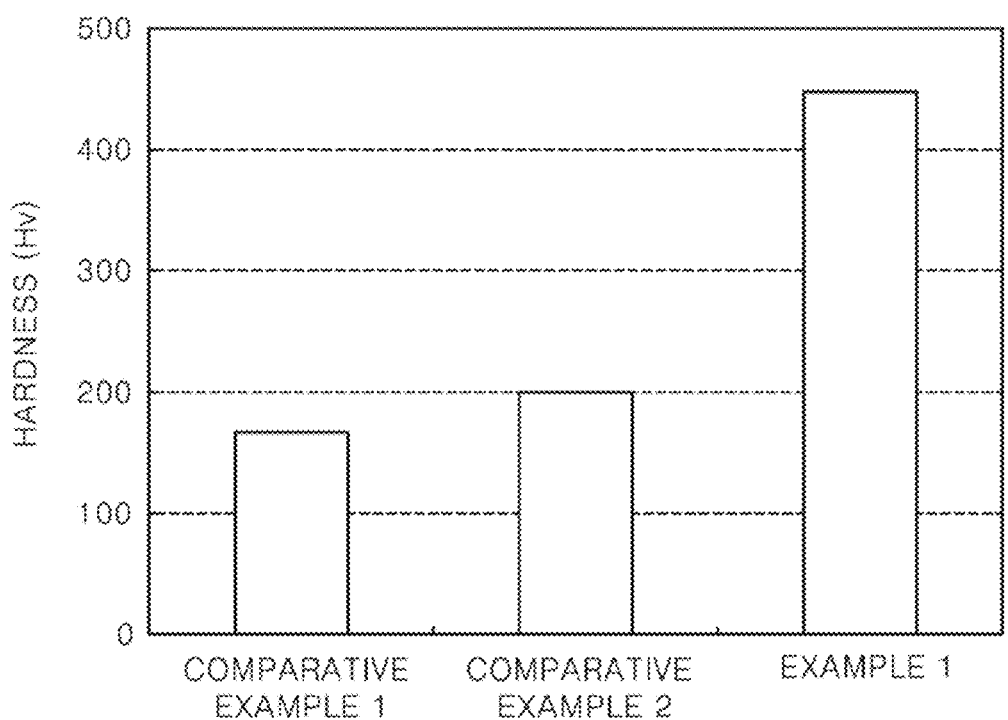
FIG. 6 is a graph showing a result of hardness measurement with respect to Comparative Examples 1 and 2 above and Example 1 above.

FIG. 6 is a graph showing a result of hardness measurement with respect to Comparative Examples 1 and 2 above and Example 1 above.

As seen from FIG. 6, as described above, in the case of Comparative Examples 1 and 2, hardness after infiltration is just 167 Hv and 200 Hv and, on the other hand, in the case of a test piece according to Example 1, only a portion of a shank is selectively and rapidly heated via high-frequency induction heating and, then, is rapidly cooled via forcible cooling and, accordingly, the hardness is greatly increased to 448 Hv.

Figure 7:
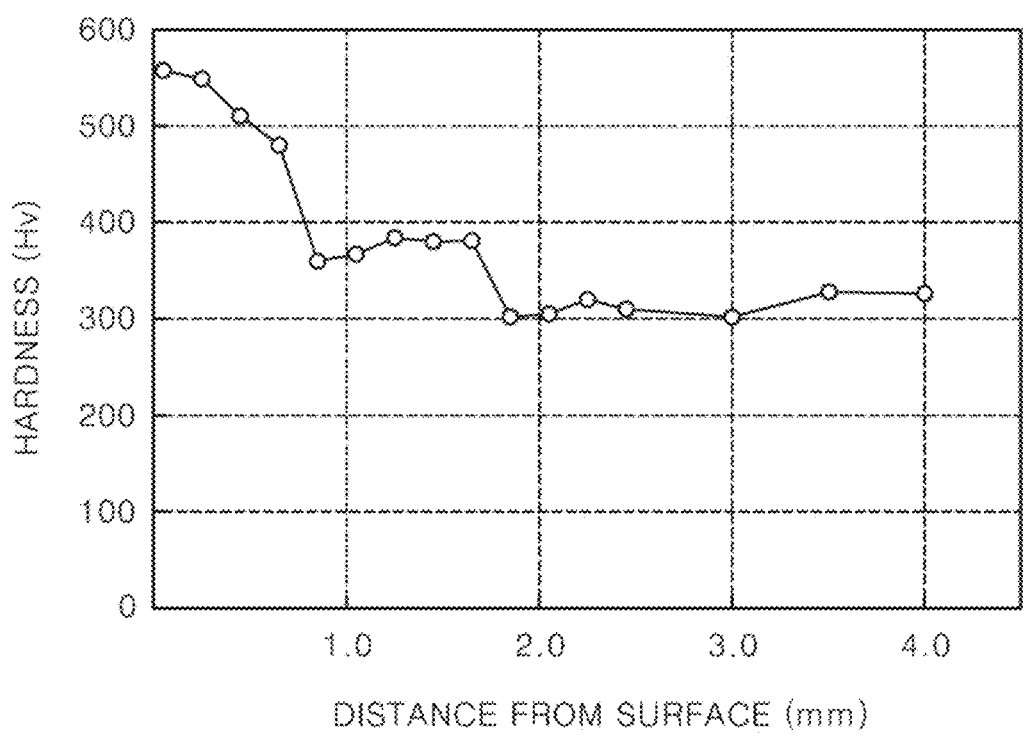
FIG. 7 is a graph showing a result of hardness measurement according to a distance from a surface in Example 1 above.

FIG. 7 is a graph showing a result of hardness measurement according to a distance from a surface in Example 1 above.

As seen from FIG. 7, in the case of a test piece according to Example 1 above, a body part of a shank has hardness of 300 Hv or more to 4.0 mm from a body of the body part.

Figure 8:
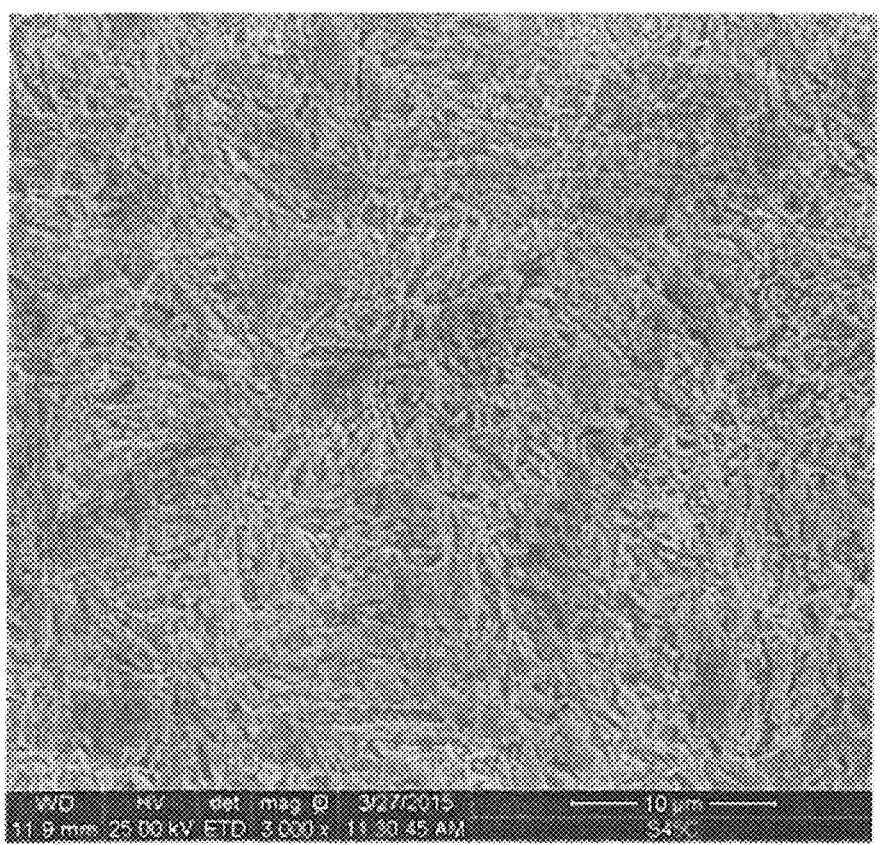
FIG. 8 is an image showing a last fine structure of a body part of a drill bit according to Example 1.
Figure 9:
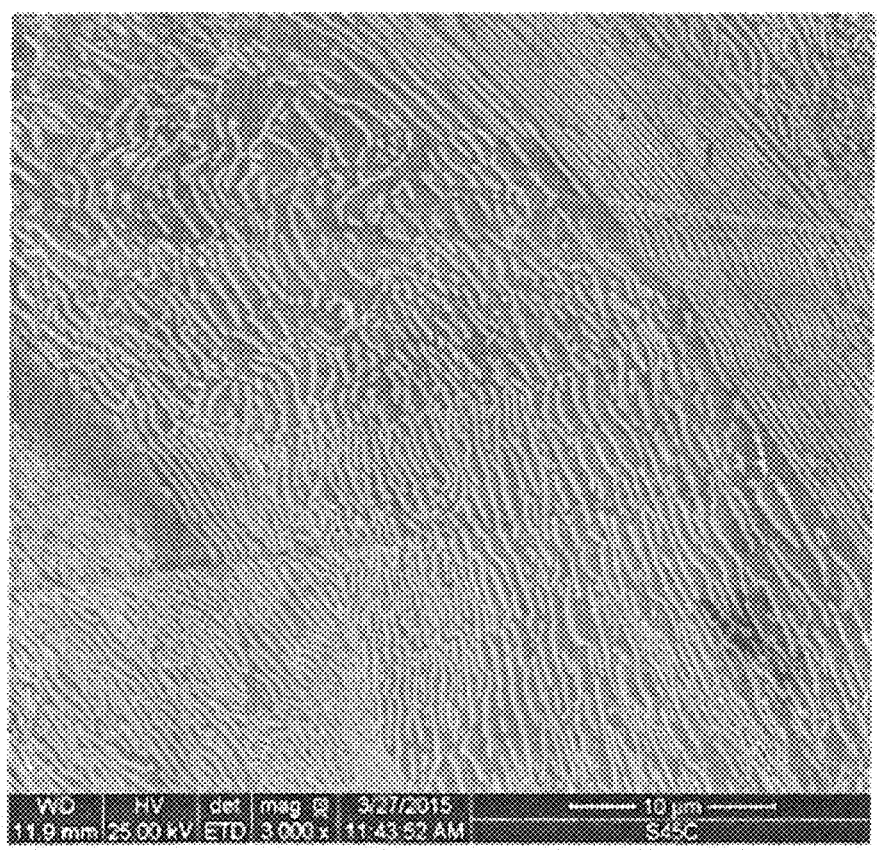
FIG. 9 is an image showing a last fine structure of a body part of a drill bit according to Comparative Example 1.

FIG. 8 is an image showing a last fine structure of a body part of a drill bit according to Example 1. FIG. 9 is an image showing a last fine structure of a body part of a drill bit according to Comparative Example 1.

As seen from FIG. 8, in the case of Example 1, the body part has martensite, which has a rapid-cooled and heat-treated structure as a last fine structure.

On the other hand, as seen from FIG. 9, in the case of Comparative Example 1, the body part has pearlite, which has a non-heat structure as a last fine structure.

The present disclosure described above may be variously substituted, altered, and modified by those skilled in the art to which the present disclosure pertains without departing from the scope and sprit of the present disclosure. Therefore, the present disclosure is not limited to the above-mentioned exemplary embodiments and the accompanying drawings.

| [Explanation of Reference Numerals] | |
| --- | --- |
| 100: drill bit for drilling | 120: shank |
| 122: body part of shank | 124: screw coupling part of shank |
| 125: screw thread | 140: diamond tip |
| 200: high-frequency induction heating and cooling composite unit | |
| 210: induction coil | |
| 220: cooling medium supply line | 230: high-frequency controller |
| 240: cooling water supply controller | |
| S110: coupling diamond tip to shank | |
| S120: rapidly heating shank surface | |
| S130: rapidly cooling shank surface | |

The invention claimed is:

1. A method of manufacturing a drill bit for drilling, the method comprising:
   (a) integrally coupling a shank and a diamond tip;
   (b) spraying cooling medium on a surface of the diamond tip immediately after rapidly heating a surface of a body part of the shank up to point Ac3 to point Ac3+200° C. via high-frequency induction heating; and
   (c) rapidly cooling the surface of the body part of the heated shank at speed of 20° C./sec or more via forcible cooling,
   the shank comprises a body part connected to a lower end of the diamond tip and having a first thickness, and a screw coupling part integrally connected to a lower end of the body part and having a second thickness smaller than the first thickness;
   hardness of a surface of the body part of the shank has a higher value than hardness of a surface of the screw coupling part of the shank;
   the body part of the shank has 300 Hv or more as hardness to 2 mm from the surface;
   and the shank is cylindrical and an outer surface of the shank has a uniform radius,
   wherein the diamond tip is attached to the upper end of the shank, and the screw coupling part is threaded,
   wherein a heat treatment is performed between the screw coupling part and the diamond tip so that the diamond tip and the screw coupling part are not heat treated,
   wherein the shank includes Si of 0.5 wt % or less, Mn of 0.1 to 2.0 wt %, S of 0.02 wt % or less, P of 0.03 wt % or less, Mo of 0.05 to 0.50 wt %, Cr of 0.1 to 0.5 wt %, B of 0.001 to 0.010 wt %, and Fe and other inevitable impurities.

2. The method of claim 1, wherein (a) comprises:
   (a-1) inserting the shank into a matrix comprising a diamond mold and a backing part connected to the diamond mold;
   (a-2) infiltrating the diamond mold at 850 to 1300° C. to couple the diamond tip to an upper end of the shank; and (a-3) cooling the shank with the diamond tip coupled thereto via furnace cooling.

3. The method of claim 2, wherein (a) further comprises (a-4) performing a lathe machining process on the cooled shank.

4. The method of claim 2, wherein, in (a-3), the cooling is performed at speed of 1° C./sec or less via furnace cooling or performed at speed of 5° C./sec or less via air cooling.

5. The method of claim 1, wherein, in (b), the shank and the diamond tip are rotated at speed of 10 to 200 rpm.

6. The method of claim 1, wherein, in (b), the high-frequency induction heating is performed up to a lower end of the body part of the shank from an upper end of the body part of the shank and is not performed on a screw coupling part connected to the lower end of the body part of the shank.

7. The method of claim 1, wherein (b) comprises simultaneously performing high-frequency induction heating and cooling using a high-frequency induction heating and cooling composite unit comprising an induction coil coiled to surround an outer circumferential surface of the shank and a cooling medium supply line that is installed below the induction coil to be spaced apart therefrom and coiled to surround the shank and the diamond tip and in which cooling medium circulates.

8. The method of claim 7, wherein the high-frequency induction heat heating and cooling composite unit comprises further comprises:
   a high-frequency controller configured to control a high-frequency signal applied to the induction coil; and
   a cooling medium supply controller configured to control supply of cooling medium introduced into the cooling medium supply line.

* * * * *